Dec. 23, 1958 A. W. AWOT ET AL 2,866,183

ANALOG-TO-DIGITAL CONVERTER

Filed April 24, 1953 2 Sheets-Sheet 1

INVENTORS
ADOLPH W. AWOT
BERNARD M. GORDON
MAURICE A. MEYER

BY Joseph Weingarten
ATTORNEY

Dec. 23, 1958 A. W. AWOT ET AL 2,866,183

ANALOG-TO-DIGITAL CONVERTER

Filed April 24, 1953 2 Sheets-Sheet 2

INVENTORS
ADOLPH W. AWOT
BERNARD M. GORDON
MAURICE A. MEYER

BY Joseph Weingarten
ATTORNEY

United States Patent Office 2,866,183

Patented Dec. 23, 1958

2,866,183

ANALOG-TO-DIGITAL CONVERTER

Adolph W. Awot, Marblehead, Bernard M. Gordon, Concord, and Maurice A. Meyer, Natick, Mass., assignors to Laboratory for Electronics, Inc., Boston, Mass., a corporation of Delaware Application April 24, 1953, Serial No. 350,994

13 Claims. (Cl. 340—347)

The present invention relates in general to the translation of data from one system of notation to another and more particularly concerns novel apparatus for reliably and unambiguously providing a digital representation of continuous, analog input information. Devices performing this function have become known in the art as analog-to-digital converters and are in extensive use in electrical computers and allied data processing equipment.

The field encompassed by the general terminology, analog-to-digital converter, is exceedingly broad. For example, the common revolution counter which accepts analog information in the form of shaft rotation at a fixed or variable rate to yield a visible decimal count is a device within this class. The present invention, however, is directed toward apparatus which, in response to analog input variation, provides an electrical output signal preferably in the binary system of notation for processing in computation circuits as required.

Within this specific subdivision of the analog-to-digital converter art, numerous electromechanical arrangements have been disclosed for performing the necessary transformation. In most existing devices, shaft rotation is transformed into appropriate movement of a character cylinder or disk divided into conductive and non-conductive areas engaged by a suitable number of contacts to meet the needs of the desired output code. But where precision and unambiguity have been primary requisites, those available devices have proved inadequate. Thus, consider a cylinder having a peripheral surface progressively divided into conductive and non-conductive zones in accordance with a sequence of binary numbers. During such periods that the code pick-up contacts positively engage the conductive and non-conductive areas representing a particular number, little error is experienced. However, in the region between successive binary numbers, the contacts often fail to yield a truly digital representation of the value of the analog input. In this transition state, even insignificant imperfections in contact alignment, contact pressure or character roll finish will result in some contacts engaging the areas representing one digit while the others contact areas representing the next consecutive number.

Other difficulties have been encountered which tend to limit the use of an analog-to-digital converter for furnishing reliable binary signals to associated apparatus. In high speed operation, the effect of the continued current interruption at the points of contact becomes quite serious in limiting contact life and occasionally introducing spurious responses.

The present invention contemplates and has as a primary object the provision of a compact analog-to-digital converter which substantially eliminates the possibility of ambiguity commonly associated with the transition periods of earlier devices while simplifying design and obviating the need for exceptional accuracy and close machine tolerances. In one specific aspect of this invention, a pair of character rolls or similar encoding devices are intermittently and alternately driven during continuous change of the analog input. Contacts associated with both character rolls are so operative that an output signal is derived only during the interval when a character roll is stationary. In this manner, a current carrying contact is never interrupted, insuring long contact and encoding roll life together with elimination of unwanted spurious responses and transient effects. By virtue of these novel timing techniques, the character rolls exchange the advance and information read-out functions during change of a least significant digit. When each contact arrives at its read-out or stationary position, a locking mechanism is instantaneously operative to prevent drift so that ambiquity is wholly avoided.

It is another object of the present invention to provide an analog-to-digital converter yielding an unambiguous electrically coded output signal irrespective of analog variation rate and irrespective of the number of information "bits" in the binary code output. A further object of this invention is to provide means for delivering a binary code from stationary contacts in response to continuous input signal change. Still another object of this invention is to provide an analog-to-digital converter requiring a minimum of driving torque, while offering the feature of firm contact pressure during read-out.

These and other objects of the present invention will become apparent from the following detailed specification when taken in connection with the drawing in which.

Figure 1:
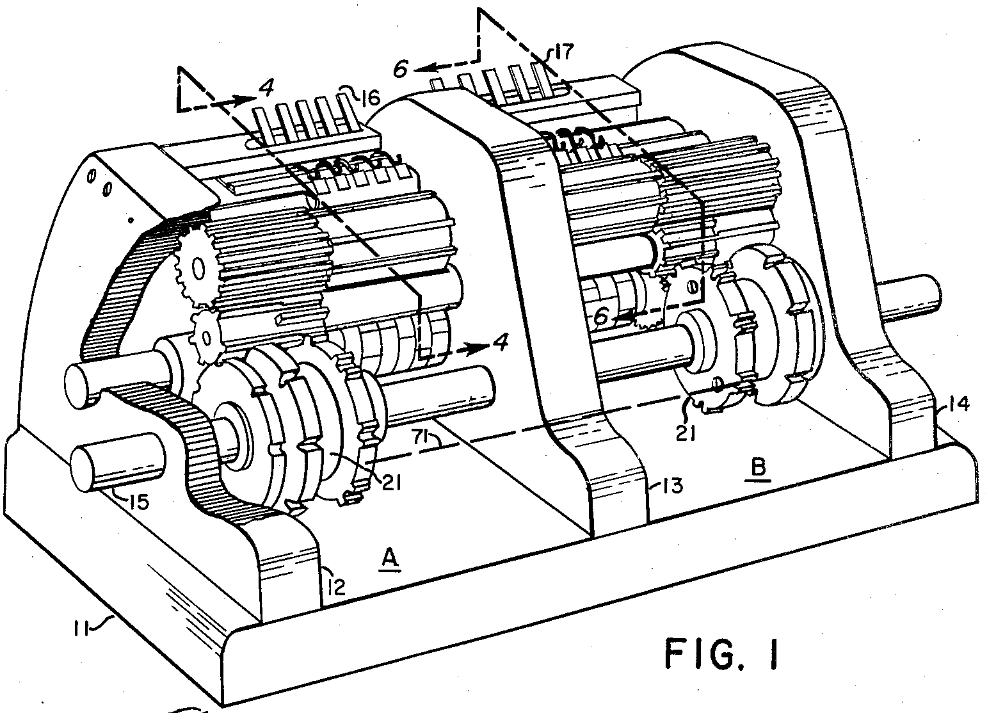
Fig. 1 is a general perspective view of a preferred embodiment of the analog-to-digital converter of this invention.
Figure 2:
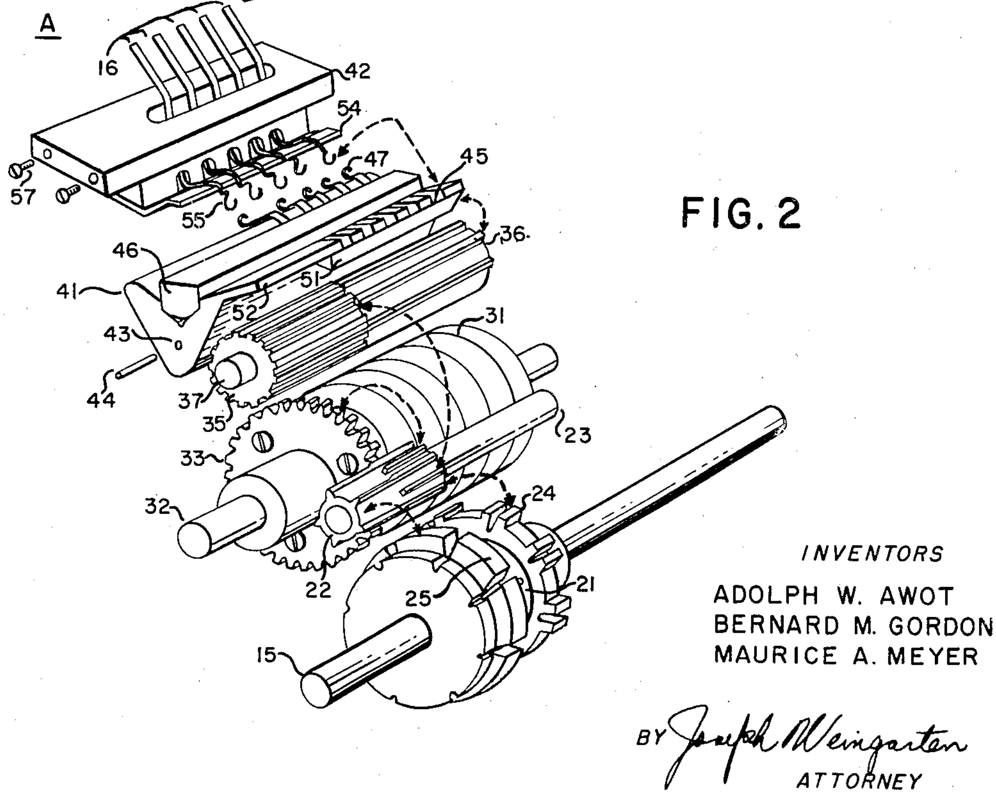
Fig. 2 is an exploded perspective view illustrating the principal components of a section of the apparatus illustrated in Fig. 1.

With reference now to the drawing, and more particularly to Figs. 1 and 2 thereof, the physical characteristics of the analog-to-digital converter will first be described. The apparatus shown comprises a structural frame formed of a supporting base plate 11 and three longitudinally spaced supporting standards 12, 13 and 14. In order to simplify both the drawings and the following discussion, certain conventional mechanical details have been omitted, among which are the means for securing the standards to the base, the outer enclosure and dust shield, and such well-known mechanical expedients as bearing inserts, lubrication systems, and the like.

The basic input to the analog-to-digital converter is a cylindrical shaft 15, parallel to base plate 11, and extending through aligned openings in the three standards. Analog input as shaft rotation is particularly convenient since substantially all known forms of continuous variation may be converted thereto with little sacrifice in accuracy. For example, if linear displacements are available to represent a function, rack and pinion gearing may be inserted for conversion of rectilinear motion to shaft rotation. Fluctuating potentials or currents may be translated into corresponding proportional shaft rotation through the use of servoed potentiometers.

In accordance with the principles of this invention, angular displacements of shaft 15 provide alternately at contact sets 16 and 17 an electrical signal in binary notation representative of this analog input. To accomplish this, the apparatus illustrated is formed of substantially two identical sections, herein designated as A and B, disposed respectively to the left and right of central standard 13. In Fig. 1, where the components are illustrated in their assembled form, certain structural details of the elements themselves are obscured. Thus, reference is now made to Fig. 2 where, without fully analyzing operational relationships, the details of each of the key elements used will be described. In Fig. 2, arrowheads are used to denote those elements which are in contact in the assembled state. It will be understood that although Fig. 2 shows in exploded perspective fashion the components of the A section of the converter, the individual components in the B section are substantially identical.

Specifically, shaft 15 supports a rigidly attached toothed and slotted wheel 21 for engagement with a companion toothed wheel 22, the latter being secured to idler shaft 23. As viewed in Fig. 2, the right-hand half of wheel 22 is formed with spur-gear teeth, while the left-hand half is formed by removing alternate teeth and shaping the remaining teeth as shown. When engaged, wheels 21 and 22 will translate continuous circular motion of shaft 15 into intermittent circular motion of wheel 22. Paired teeth such as 24 on wheel 21 progressively advance teeth on the spur-gear side of wheel 22. During the dead movement of driving wheel 21 in the region between pairs of teeth 24, the teeth on the left-hand side of wheel 22 in cooperation with the arcuate segments, such as 25 on wheel 21, combine to lock wheel 22 and shaft 23 against spurious and undesired rotation. Since there are eight pairs of teeth 24 and eight segmental sections 25 on wheel 21, it will be evident that shaft 23 will advance an amount corresponding to the angle between two teeth on the spur-gear sections of wheel 22 for each 45° rotation of shaft 15. This is an arbitrary selection and may be altered simply by gear ratio variations. It will also be understood that the intermittent circular motion device described immediately above is but illustrative of one of the many intermittent feed mechanisms available to perform this function.

A digital character roll 31 is rotatably supported upon shaft 32 and actuated by attached gear 33. The surface of the character roll is formed of conductive and non-conductive areas in a manner to be described in detail below, and thereby provides the basis for generating the desired electrical coded output. Gear 33 is driven directly from the spur section of wheel 22 so that the motion of the character roll is intermittent in nature, while being securely locked between changes.

A pair of axially spaced toothed elements 35 and 36 are rigidly fastened together and arranged for free rotation upon supporting shaft 37. Section 35 of this combination is a gear meshed directly with the spur-gear section of wheel 22. Section 36 is operative as a cam and is formed with uniformly spaced teeth, half the number on section 35, and displaced therefrom as illustrated in the drawing.

Contact carrying elements 41 and 42 are preferably made of a durable plastic insulating material. Element 41 is formed with a pair of small longitudinal axial bores 43 on opposite ends thereof for pivotal support upon a corresponding pair of pins 44 extending from the supporting standards. Five conductive strip contacts 45 are affixed to the upper surface of element 41. These are preferably set in small grooves to prevent lateral displacement thereof and are held in place by insulating wedge 46 which may be cemented or otherwise attached in the position shown. At the right-hand ends thereof, as viewed in Fig. 2, contacts 45 present a smooth, flat conductive surface, while at the opposite ends, these are shaped to provide an array of curved, resilient brushes 47. An insulating wedge 51, formed as an integral extension of the supporting lip 52 of element 41, serves as a cam follower in a manner to be disclosed.

Contact carrying element 42 provides at contacts 16 the digital output of the system. Essentially, element 42 is formed of a number of insulating blocks cemented together to support and space contacts 16. Contacts 16 are formed of conductive resilient strips which extend through element 42 and over lip 54, and individually shaped to form the brushes 55. The lateral spacing between brushes 55 corresponds with that of contact strips 45. Contact bearing element 42 is integrated into the converter structure shown in Fig. 1 and rigidly attached by a plurality of screws 57 extending from the supporting standards. Further structural details of elements 41 and 42 which do not require further description will be seen in Figs. 3, 4 and 5.

Figure 3:
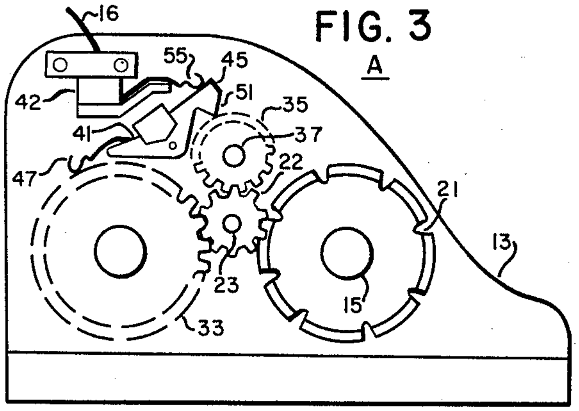
Fig. 3 is an end view of the section of the analog-to-digital converter whose component parts are illustrated in Fig. 2.

In Fig. 3, there is shown an end view of assembled section A of the analog-to-digital converter illustrated in Fig. 1, and for clarity, standard 12 has been removed. Certain relationships which have been discussed only briefly above are immediately apparent from inspection of Fig. 3. Thus, it is seen that input shaft 15 and the input drive wheel 21 supported thereon are arranged to drive wheel 22 which, in turn, intermittently drives both the character roll drive gear 33 and gear 35 as supported upon shaft 37. Contact bearing elements 41 and 42 are arranged so that each of terminals 16 is electrically connected to a corresponding brush 47 for engagement with the character roll 31. The circuit from each terminal 16 to each brush 47 is completed through the sliding engagement of each brush 55 and its associated flat contact strip 45. Cam follower wedge 51 in association with the cam teeth of wheel section 36 (not shown in Fig. 3) cause element 41 to operate pivotally about its pin mounting. By virtue of their resilience, brushes 55 provide a continuous force tending to rotate element 41 into engagement with the cam unit. This spring bias normally tends to raise contact 47 from engagement with the character roll 31.

At this point, it is in order to set forth the actual gear arrangements successfully used in one embodiment of the apparatus shown.

| | |
|---|---|
| Wheel **21** | Eight pairs of teeth **24** and eight segments **25**. |
| Wheel **23** | Ten spur-gear teeth and five motion locking teeth. |
| Character roll **31** | Sixteen four digit binary numbers. |
| Gear **33** | Thirty-two teeth. |
| Gear **35** | Fourteen teeth. |
| Cam **36** | Seven teeth. |

Thus, as gear 33 is rotated two teeth, a full digit change will occur on character roll 31 and cam 36 will have traveled an amount equal to the space between two adjacent cam teeth. Though found quite useful in practice, it will be understood that numerous other gear relationships may be employed with equal effect so long as the relative timing functions noted later remain undisturbed.

With the structural relationships noted above in view, it is now possible to analyze fully the operation of section A of the converter in response to rotation of input shaft 15. From Fig. 3, it is apparent that continuous rotation of shaft 15 in either direction will cause intermittent actuation of wheel 22, and corresponding intermittent motion of cam 36. Intermittent motion will likewise be imparted simultaneously to character roll 31 through gear 33.

Figure 4:
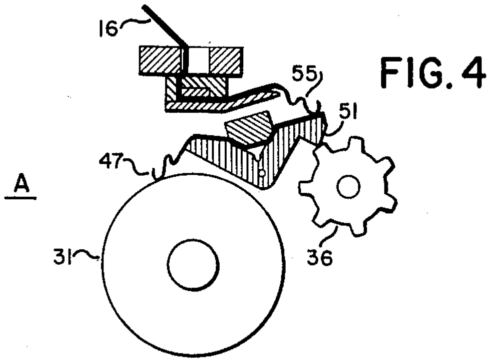
Fig. 4 is a fragmentary cross-sectional view taken along the lines 4—4 of Fig. 1.
Figure 5:
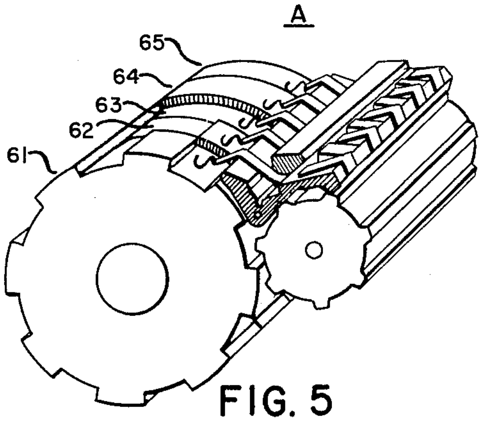
Fig. 5 is a fragmentary perspective view, partially in cross-section, illustrating structural details of components shown in Fig. 4.

With specific reference to Figs. 4 and 5, the relative orientation of the contact bearing elements with respect to the character roll is illustrated for a condition where the cam follower wedge 51 resides directly upon one of the teeth of cam 36. This condition exists throughout the interval represented by the dead space between two adjacent pairs of teeth 24, and during this interval, brushes 47 firmly contact stationary character roll 31 and complete circuits to be described in greater detail below. Rotation of cam 36 in either direction from the position shown in Figs. 4 and 5 will cause cam follower 51 to fall into the depression between teeth thereof, and under the influence of the bias provided by brushes 55, will lift brushes 47 from the surface of the character roll to interrupt whatever circuits were initially made there. Continued rotation of shaft 15 will cause further rotation of cam 36 and character roll 31, and when cam follower 51 arrives upon the succeeding tooth of cam 36, new areas of the character roll 31 will be contacted by brushes 47. Thus, when the contact roll 31 is in motion, brushes 47 are disengaged. When contact roll 31 is stationary and locked, brushes 47 are engaged. Friction, torque, and contact wear are all minimized in this manner.

Fig. 5 shows the nature of character roll coding. For the binary code desired here, character roll 31 is formed by closely and rigidly stacking five circular conductive disks of equal diameter each cut to provide peripheral raised and depressed zones. For example, in Fig. 5, the outer disk 61 has been cut into sixteen equi-angular segments representing the least significant digit of the binary code. Second disk 62 has been cut into eight equi-angular zones; third disk 63, into four; and fourth disk 64, into two; while the fifth disk 65 is smooth and uncut.

Figure 8:
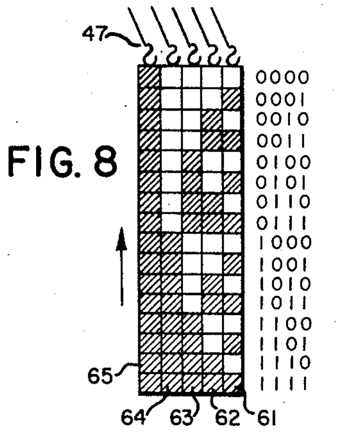
Fig. 8 is a schematic development of a character roll used in the apparatus in Fig. 1 for the purpose of picturing a possible code usable therewith.

The manner in which the zones are arranged and the relative binary values thereof are indicated most clearly in Fig. 8 which is a development of the surface of the character roll 31, shaded and clear areas representing raised and depressed zones respectively. The five brushes 47 which are engaged with and disengaged from the character roll during rotation of cam 36 are schematically illustrated over the respective disks in Fig. 8. Disk 65 serves as a slip ring by which the potential of its associated brush is transferred to all conductive areas of the character roll. As shown in Fig. 5, when brushes 47 are pressed into engagement with character roll 31, contact is only made with the raised conductive surface while no contact is made in the depressed regions of the disks. To preclude spurious contact between a brush and the conductive areas in one of the disk notches, these may be filled with a suitable insulating compound (not shown).

With reference once again to Fig. 8, assuming that the character roll 31 rotates in the direction shown by the arrowhead, the first position would represent the binary code for zero since, aside from the slip ring 65, no other contact is made. In the second position, the binary code 0001 would be indicated, and continued rotation would progressively increase the value of the binary representation until the final binary value 1111, or fifteen, was achieved. Continued rotation thereafter would cause the code to revert to zero.

The number of binary digits which may be represented by any character roll will depend on the number of disks stacked together. However, an increase in the number of disks must be accompanied by a proportionate decrease in the angular width of the digit representation on each disk.

It has been observed earlier that the A and B sections of the apparatus illustrated in Fig. 1 are physically realized by assembly of substantially identical component parts. Of special importance is the initial phase displacement of intermittent drive wheel 21 in section B with respect to its counterpart in section A. By broken line 71, there has been indicated on the drawing the fact that each tooth pair on wheel 21 in section A is angularly oriented with respect to shaft 15 midway between corresponding sets of teeth on wheel 21 in section B. In other words, during rotation of shaft 15 in a predetermined direction, intermittent motion is first imparted to the driven wheels in section A, thereafter, shaft 15 will continue to rotate for 45° in the same direction before these wheels are again actuated. However, at a point midway between successive intermittent movements in section A, intermittent motion will be imparted to the driven wheels in section B.

Figure 6:
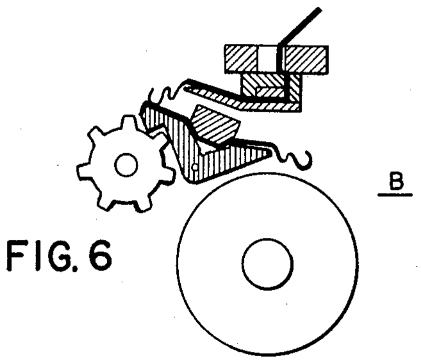
Fig. 6 is a fragmentary cross-sectional view taken along the lines 6—6 of Fig. 1.
Figure 7:
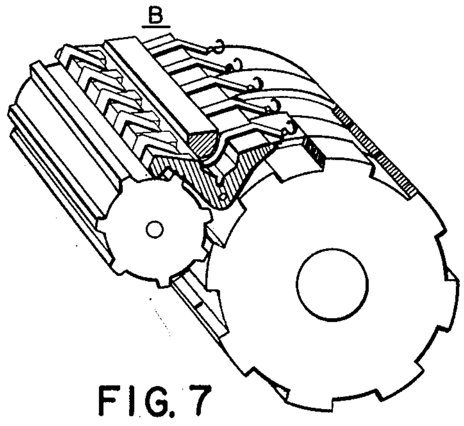
Fig. 7 is a fragmentary perspective view, partially in cross-section, illustrating structural details of components also shown in Fig. 6.

Figs. 4 and 5, representing a possible orientation in the A section, may now be compared with Figs. 6 and 7, which represent the position of the corresponding elements in the B section at the same instant. Note that while contacts 47 in section A are engaged, their counterparts in section B are disengaged. Effectively then, section A performs the read-out function while section B advances the number represented. Thereafter, section B will assume the read-out function and section A, the digit transfer function. The arrangement is independent of the direction of rotation or the rate of rotation of the analog input.

Where only two character rolls are employed functioning alternately as noted, there occurs a brief period during which the switching process removes both sets of contacts from the character rolls. In applications where the analog input varies continuously at a substantial rate, this interruption is of no serious consequence, especially if the digital output of the converter is sampled only periodically for brief periods and the sampling is synchronized not to occur during this short period. However, in certain applications where zero or exceedingly low input angular velocities are practical possibilities, this non-responsive period may impose a limitation. Where such signals are encountered, however, it is possible to combine the character rolls shown with contacts which constantly engage the peripheral surfaces thereof, and further, with an external switch actuated by shaft 15 for switching the potential input to the character rolls through the disks in the transition interval. If an electronic switch is employed, its instantaneous action will permit the read-out of a binary number with substantially no ambiguity and no intervening inactive periods.

From the foregoing discussion, it is evident that numerous modifications and departures may now be made by those skilled in this electrical art, the invention herein is to be construed as limited only by the spirit and scope of the appended claims.

What is claimed is:

1. An analog-to-digital converter comprising, an input shaft, a plurality of digital character rolls, a corresponding plurality of contact sets each arranged to be engaged and disengaged from the respective digital character roll, and means responsive to motion of said input shaft for actuating each of said digital character rolls solely during intervals of disengagement from its associated contact set.

2. An analog-to-digital converter comprising, an input shaft, first and second digital character rolls, first and second intermittent drive mechanisms operative from said input shaft for alternately actuating said digital character rolls, first and second output means respectively associated with said first and second digital character rolls, and driving means operative from said input shaft for alternately coupling said first and second output means to said first and second digital character rolls respectively.

3. An analog-to-digital converter comprising, an input shaft, first and second digital character rolls, first and second intermittent drive mechanisms operative from said input shaft for alternately actuating said first and second rolls respectively, and first and second pivotally supported contact sets associated with said first and second character rolls and alternately actuated from said first and second intermittent driving mechanisms respectively.

4. An analog-to-digital converter comprising, an input shaft, first and second angularly displaced intermittent drive mechanisms affixed to said input shaft, first and second angularly displaced digital character rolls alternately and intermittently actuated by said driving mechanisms, first and second contact sets disposed for pivotal engagement and disengagement with said first and second character rolls respectively, means normally biasing said contact sets for disengagement from said character rolls, and means actuated by said first and second intermittent drive mechanisms for alternately and intermittently causing engagement of said contact sets and associated character rolls.

5. An analog-to-digital converter comprising, an input shaft, first and second angularly displaced intermittent drive mechanisms affixed to said input shaft, first and second angularly displaced digital character rolls alternately and intermittently actuated by said driving mechanisms, first and second contact sets disposed for pivotal engagement and disengagement with said first and second character rolls respectively, means normally resiliently biasing said contact sets for disengagement from said character rolls, and means actuated by said first and second intermittent drive mechanisms for alternately and intermittently causing engagement of said contact sets and associated character rolls, said biasing means providing the output terminals for said converter.

6. An analog-to-digital converter for unambiguously translating forward or backward rotation of an input shaft to a digital binary code comprising, first and second character rolls having peripheral conductive and non-conductive zones, first and second intermittent drive mechanisms affixed to said input shaft and arranged for alternately and intermittently actuating said first and second character rolls respectively, first and second cams arranged for alternate and intermittent actuation by said first and second drive mechanisms respectively, first and second pivotally disposed contact supporting members each formed with a cam follower for engagement with said first and second cams respectively and each carrying a plurality of contacts for engagement with the respective character rolls, first and second fixed supporting members each carrying a corresponding plurality of resilient contacts in engagement with the respective contacts on said first and second pivoted members and normally biasing said pivotally disposed members into engagement with the respective cams, whereby said contacts on said fixed supporting members alternately yield a digital output representative of the angular displacement of said input shaft.

7. An analog-to-digital converter for unambiguously translating forward or backward rotation of an input shaft to a digital binary code comprising, a structural frame supporting said input shaft and having first and second analog-to-digital conversion mechanisms thereon, each of said mechanisms including a gear intermittently driven from said input shaft, a character roll formed of a plurality of stacked circular disks each having peripheral conductive and non-conductive zones in accordance with a predetermined binary code, means coupling said character roll to said gear, a substantially cylindrical toothed cam actuated by said gear, a contact carrying member pivotally supported within said frame and formed with an integral cam follower normally biased into engagement with said cylindrical cam, contacts on said contact supporting member extending into the region of the surface of said character roll disks, said cam, cam follower and contacts being arranged whereby during rotation of said cam, said contacts are intermittently engaged with and disengaged from the peripheral surface of said character roll disks for yielding the output binary signal.

8. Apparatus as in claim 7 wherein said first and second analog-to-digital conversion mechanisms are relatively displaced in angular phase to provide alternate actuation of said character rolls and said cylindrical cams.

9. Apparatus as in claim 7 and including means for locking said gear in each of said analog-to-digital conversion mechanisms against spurious rotation during intervals between intermittent actuation thereof.

10. Apparatus as in claim 7 wherein said intermittently driven gears in said first and second analog-to-digital conversion mechanisms are phased whereby on continuous rotation of said input shaft, said cams are alternately and intermittently actuated, and said character rolls advance intermittently solely during periods when said contacts are disengaged therefrom.

11. Apparatus as in claim 7 wherein said intermittently driven gears in said first and second analog-to-digital conversion mechanisms are angularly phased whereby during continuous rotation of said input shaft, said cams are alternately and intermittently actuated and said character rolls advance intermittently solely during periods when the associated contacts are disengaged therefrom, and means locking each of said gears, each of said character rolls, and each of said cams during intervals between intermittent actuation thereof.

12. An analog-to digital converter for unambiguously translating forward or backward rotation of an input shaft to a digital binary code comprising, first and second character elements having conductive and non-conductive zones, first and second drive mechanisms affixed to said input shaft and arranged for alternately and intermittently actuating said first and second character elements respectively, first and second cams arranged for alternate and intermittent actuation by said first and second drive mechanisms respectively, first and second movable contact supporting members each formed with a cam follower for engagement with said first and second cams respectively and each carrying a plurality of contacts for engagement with the respective character elements, first and second fixed supporting members each carrying a corresponding plurality of resilient contacts in engagement with the respective contacts on said first and second movable members and normally biasing said movable members into engagement with the respective cams, whereby said contacts on said fixed supporting members alternately yield a digital output representative of the angular displacement of said input shaft.

13. An analog-to-digital converter for unambiguously translating forward or backward rotation of an input shaft to a digital binary code comprising, a structural frame supporting said input shaft and having first and second analog-to-digital conversion mechanisms thereon, each of said mechanisms including a gear intermittently driven from said input shaft, a cylindrical character roll having peripheral conductive and non-conductive zones in accordance with a predetermined binary code, means coupling said character roll to said gear, a cam actuated by said gear, a contact carrying member movably supported within said frame and having an integral cam follower normally biased into engagement with said cam, contacts on said contact supporting member extending into the region of the surface of said character roll, said cam, cam follower, and contacts being arranged whereby during rotation of said cam, said contacts are intermittently engaged with and disengaged from the peripheral surface of said character roll for yielding the output binary signal.

References Cited in the file of this patent

UNITED STATES PATENTS

| | | |
|---|---|---|
| 459,465 | Allen | Sept. 15, 1891 |
| 809,847 | Samuelson | Jan. 9, 1906 |
| 1,462,875 | Stoddard | July 24, 1923 |
| 2,207,743 | Larson et al. | July 16, 1940 |
| 2,318,591 | Couffignal | May 11, 1943 |
| 2,496,585 | Harper | Feb. 7, 1950 |